United States Patent [19]
Yanagi et al.

[11] Patent Number: 5,896,194
[45] Date of Patent: Apr. 20, 1999

[54] LENS METER

[75] Inventors: Eiichi Yanagi; Yukio Ikezawa, both of Tokyo, Japan

[73] Assignee: Kabushiki Kaisha Topcon, Tokyo, Japan

[21] Appl. No.: 08/993,312

[22] Filed: Dec. 18, 1997

[30] Foreign Application Priority Data

Dec. 20, 1996 [JP] Japan ............... 8-341840

[51] Int. Cl.⁶ .................................. G01B 9/00
[52] U.S. Cl. ............................ 356/124; 356/127
[58] Field of Search ..................... 356/124, 125, 356/126, 127

[56] References Cited

U.S. PATENT DOCUMENTS 5,173,739 12/1992 Kurachi et al. ............... 356/124
5,521,700 5/1996 Kajino et al. ................. 356/124

FOREIGN PATENT DOCUMENTS

0208736 8/1988 Japan ...................... 356/124
6194266 7/1994 Japan ...................... 356/124

*Primary Examiner*—Hoa Q. Pham
*Attorney, Agent, or Firm*—Finnegan, Henderson, Farabow, Garrett & Dunner, L.L.P.

[57] ABSTRACT

A lens meter is provided which includes a light source portion (20) with a first light source (21) for generating a lens-characteristic measuring light beam (P2) and a second light source (23) for generating a position specifying light beam (P1). A patterning plate (28) with lens-characteristic measuring patterns (28c) and position specifying patterns (28b) is disposed in an optical path (31) of the lens-characteristic measuring light beam (P2) and position specifying light beam (P1) generated by the light source portion (20). The measuring light beam (P2) is projected onto a subject lens (30) set in the optical path (31) so that the images (28c') of the lens-characteristic measuring pattern (28c) are received. The received images (28c') are analyzed, and the lens-characteristic mapping display of the subject lens (30) is performed. In this lens meter, the first and second light sources (21, 23) are separate from each other.

10 Claims, 11 Drawing Sheets

LENS METER

BACKGROUND OF THE INVENTION

1. Field of the Invention

The present invention relates to lens meters capable of performing a lens-characteristic mapping display of a subject lens to be tested.

2. Description of the Related Art

Figure 17:
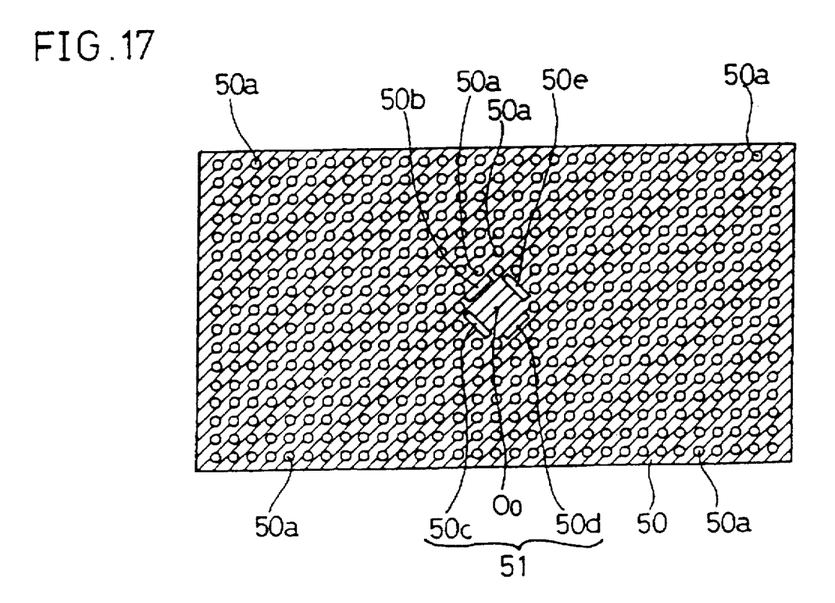
FIG. 17 is a plan view showing an example of a conventional patterning plate.
Figure 18A:
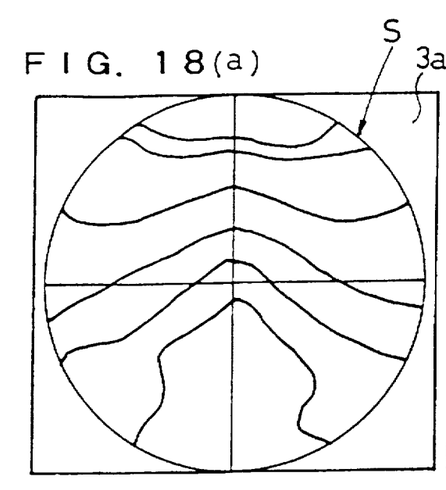
FIG. 18(a) is a diagram showing an example of the mapping display of each lens characteristic value of an eyeglass lens performed by a conventional lens meter, a spherical degree distribution being shown.
Figure 18B:
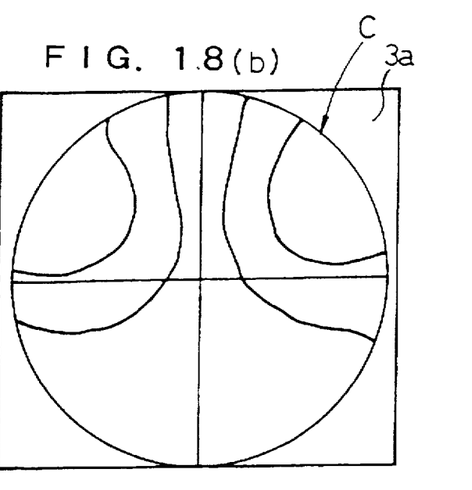
FIG. 18(b) is a diagram similar to FIG. 18(a) showing a cylindrical degree distribution.
Figure 18C:
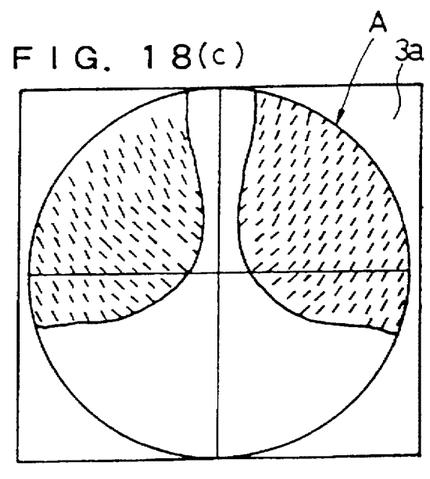
FIG. 18(c) is a diagram similar to FIG. 18(a) showing an axial angle distribution.
Figure 18D:
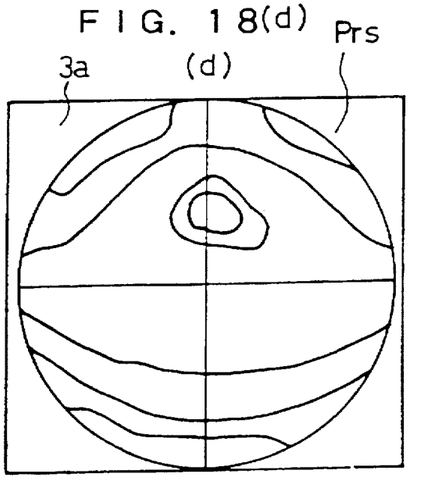
FIG. 18(d) is a diagram similar to FIG. 18(a) showing a prism degree distribution.

In conventional lens meters, a patterning plate 50 with circular holes serving as patterns 50a for measuring the lens characteristics of a subject lens is provided in the optical path of a measuring light beam emitted by a light source portion, as shown in FIG. 17. For example, a progressive power lens as a subject lens is set in the optical path, and the measuring light beam is projected onto the progressive power lens set in the optical path so that a great number of lens-characteristic measuring pattern images are received on a charge-coupled device (CCD). The images received are analyzed, and the lens characteristics, such as a spherical degree S (see FIG. 18(a)), a cylindrical degree C (see FIG. 18(b)), an axial angle A (see FIG. 18(c)), and a prism degree Prs (see FIG. 18(d)), are displayed on a display screen (mapping display).

In this kind of lens meter, a center-position determining pattern or position specifying pattern 51 consisting of four slits 50b through 50e and presenting a square shape as a whole is formed in the central portion of the patterning plate 50 so that the center position of the pattern image corresponding to the center position Oo of the patterning plate 50 can be determined, even when the optical axis of a subject lens is offset from the optical axis of the optical path.

The lens meter of the above kind is equipped with a means for determining the center position of the pattern image corresponding to the center position Oo of the patterning plate 50. The determining means processes a great number of pattern images received by the CCD, thereby identifying the difference in configuration between the image of the lens-characteristic measuring pattern 50a and the center-position determining pattern 51 and extracting the image of the center-position determining pattern 51. Based on the extracted image of the center-position determining pattern 51, the center position of the pattern image corresponding to the center position Oo of the patterning plate 50 is determined.

However, about 1000 lens-characteristic measuring patterns 50a are provided in the patterning plate 50 and, therefore, in order to determine the center position of the pattern image corresponding to the center position Oo of the patterning plate 50, the images of about 1000 lens-characteristic measuring patterns 50a and the image of the center-position determining pattern 51 must be processed. For this reason, there are the disadvantages that the image processing will take time, and that the center position of the pattern image corresponding to the center position Oo of the patterning plate 50 cannot be quickly determined.

In particular, when a subject lens set in the optical path is moved in a direction crossing the optical path, the image information being displayed on the display screen is difficult to move quickly so as to follow the movement of the subject lens.

In another lens meter of the above kind, a great number of lens-characteristic measuring patterns 50a are provided in a patterning plate 50, and the lens-characteristic measuring pattern 50a corresponding to the center position Oo of the patterning plate 50 is omitted. Based on the omission information on the image of the lens-characteristic measuring pattern 50a corresponding to the center position Oo of the patterning plate 50, the center position of the pattern image corresponding to the center position Oo of the patterning plate 50 is determined.

However, in the case of the lens meter which omits the lens-characteristic measuring pattern 50a which should be located at the center position Oo of the patterning plate 50, if the patterning plate 50 becomes dirty and even a single pattern of the lens-characteristic measuring patterns 50a which should be there is omitted, then the places at which the images of the lens-characteristic measuring patterns 50a are omitted will be 2 or more. Consequently, there is the disadvantage that the center position of the pattern image corresponding to the center position Oo of the patterning plate 50 cannot be determined.

In the case of an unprocessed lens with paint marks, a measuring light beam is shut out at a position at which the marks are painted. Therefore, as with the aforementioned case, the places at which the images of the lens-characteristic measuring patterns 50a are omitted will be 2 or more, and consequently, the center position of the pattern image corresponding to the center position Oo of the patterning plate 50 cannot be determined.

SUMMARY OF THE INVENTION

It is an object of the present invention to provide a lens meter which is capable of quickly and accurately performing the determination or specification of the center position of pattern images corresponding to the center position of a patterning plate.

To achieve this end and in accordance with one aspect of the present invention, there is provided a lens meter comprising: a light source portion with a first light source for generating a lens-characteristic measuring light beam and a second light source for generating a position specifying light beam; a patterning plate with lens-characteristic measuring patterns and position specifying patterns, the patterning plate being provided in an optical path of the lens-characteristic measuring light beam and position specifying light beam generated by the light source portion; means for receiving images of the lens-characteristic measuring patterns obtained by projecting the lens-characteristic measuring light beam onto a subject lens set in the optical path; means for analyzing the received pattern images; and means for performing a mapping display of a two-dimensional lens characteristic distribution of the subject lens, based on the analyzed pattern images; wherein the first and second light sources are separate from each other.

In a preferred form of the present invention, a ratio of a quantity of light which is emitted by the first light source and a quantity of light which is emitted by the second light source can be changed.

The light source portion preferably has a collimator lens. The collimator lens converts the measuring light beam to a collimated light beam and projects the collimated light beam onto the subject lens. In such a case, a lens portion is formed on a back surface of the patterning plate for converging or diverging the lens-characteristic measuring light beam transmitted through the patterning plate.

In another preferred form of the present invention, the first light source is constituted by a halogen lamp, and the halogen lamp is always lit during measurement.

In accordance with another aspect of the present invention, there is provided a lens meter comprising: a light source portion for generating a lens-characteristic measuring light beam and for generating a position specifying light beam; a patterning plate with lens-characteristic measuring patterns and position specifying patterns, the patterning plate being provided in an optical path of the lens-characteristic measuring light beam and position specifying light beam generated by the light source portion; means for receiving images of the lens-characteristic measuring patterns obtained by projecting the lens-characteristic measuring light beam onto a subject lens set in the optical path; means for analyzing the received pattern images; and means for performing a mapping display of a two-dimensional lens characteristic distribution of the subject lens, based on the analyzed pattern images; wherein transmittance of the position specifying patterns of the patterning plate is greater than that of the lens-characteristic measuring patterns.

In still another preferred form of the present invention, specification means is provided for specifying positions of images of the position specifying patterns, based on the lens-characteristic measuring light beam transmitted through the position specifying patterns of the patterning plate.

In accordance with still another aspect of the present invention, there is provided a lens meter comprising: a light source portion for generating a lens-characteristic measuring light beam and for generating a position specifying light beam; a patterning plate with lens-characteristic measuring patterns and position specifying patterns, the patterning plate being provided in an optical path of the lens-characteristic measuring light beam and position specifying light beam generated by the light source portion; means for receiving images of the lens-characteristic measuring patterns obtained by projecting the lens-characteristic measuring light beam onto a subject lens set in the optical path, means for analyzing the received pattern images; and means for performing a mapping display of a two-dimensional lens characteristic distribution of the subject lens, based on the analyzed pattern images; wherein images of the position specifying patterns are discriminated from those of the lens-characteristic measuring patterns, based on the fact that a light quantity of each image of the position specifying patterns based on the light beam transmitted through the position specifying patterns of the patterning plate is greater than that of each image of the lens-characteristic patterns based on the light beam transmitted through the lens-characteristic specifying patterns.

In a further preferred form of the present invention, a transmitting area of a single pattern of the position specifying patterns formed in the patterning plate is larger than that of a single pattern of the lens-characteristic measuring patterns formed in another portion of the patterning plate.

A portion of the lens-characteristic measuring light beam may be employed in the position specifying light beam.

BRIEF DESCRIPTION OF THE DRAWINGS

The present invention will be described in further detail with reference to the accompanying drawings wherein.

DETAILED DESCRIPTION OF THE PREFERRED EMBODIMENTS

First Embodiment

Figure 1:
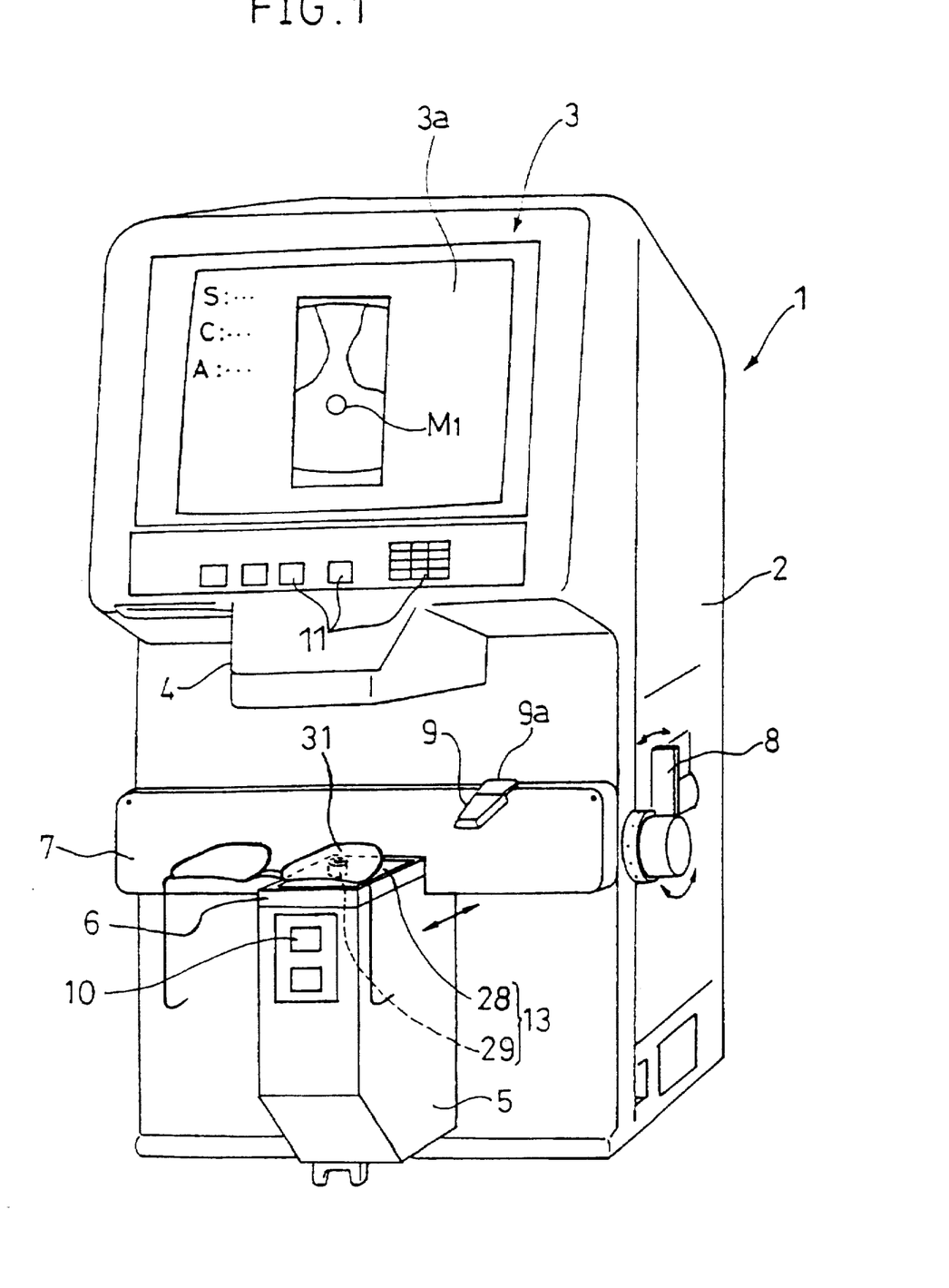
FIG. 1 is a schematic view of a lens meter according to the present invention.

Referring to FIG. 1, there is shown a lens meter 1 in accordance with a first embodiment of the present invention.

The lens meter 1 is constituted by a main body 2, a monitor 3, such as a CRT and a liquid crystal display, provided on the upper portion of the main body 2 and having a display screen 3a, an upper optical-component housing portion 4 provided on the front side of the main body 2, and a lower optical-component housing portion 5 provided so as to be positioned under the upper optical-component housing portion 4. Furthermore, the lens meter 1 is constituted by a lens receiving table 6 provided on the upper end of the lower optical-component housing portion 5, a lens pad 7 interposed between the upper and lower housing portions 4 and 5 and held on the front surface of the main body 2 so as to be movable back and forth, and a control lever 8 held on the side of the main body 2 so as to be rotatable up and down. The back and forth movements of the lens pad 7 are adjusted by up and down rotations of the control lever 8.

On the upper end of the lens pad 7 a slider 9a is held so as to be freely movable right and left, and on this slider 9a a nose-pad support member 9 is held so as to be rotatable up and down. This nose-pad support member 9 is urged upward by a spring (not shown) and the upward rotation is regulated at a horizontal position. Reference numerals 10 and 11 denote a change-over switch and a measurement start switch, respectively.

Figure 2:
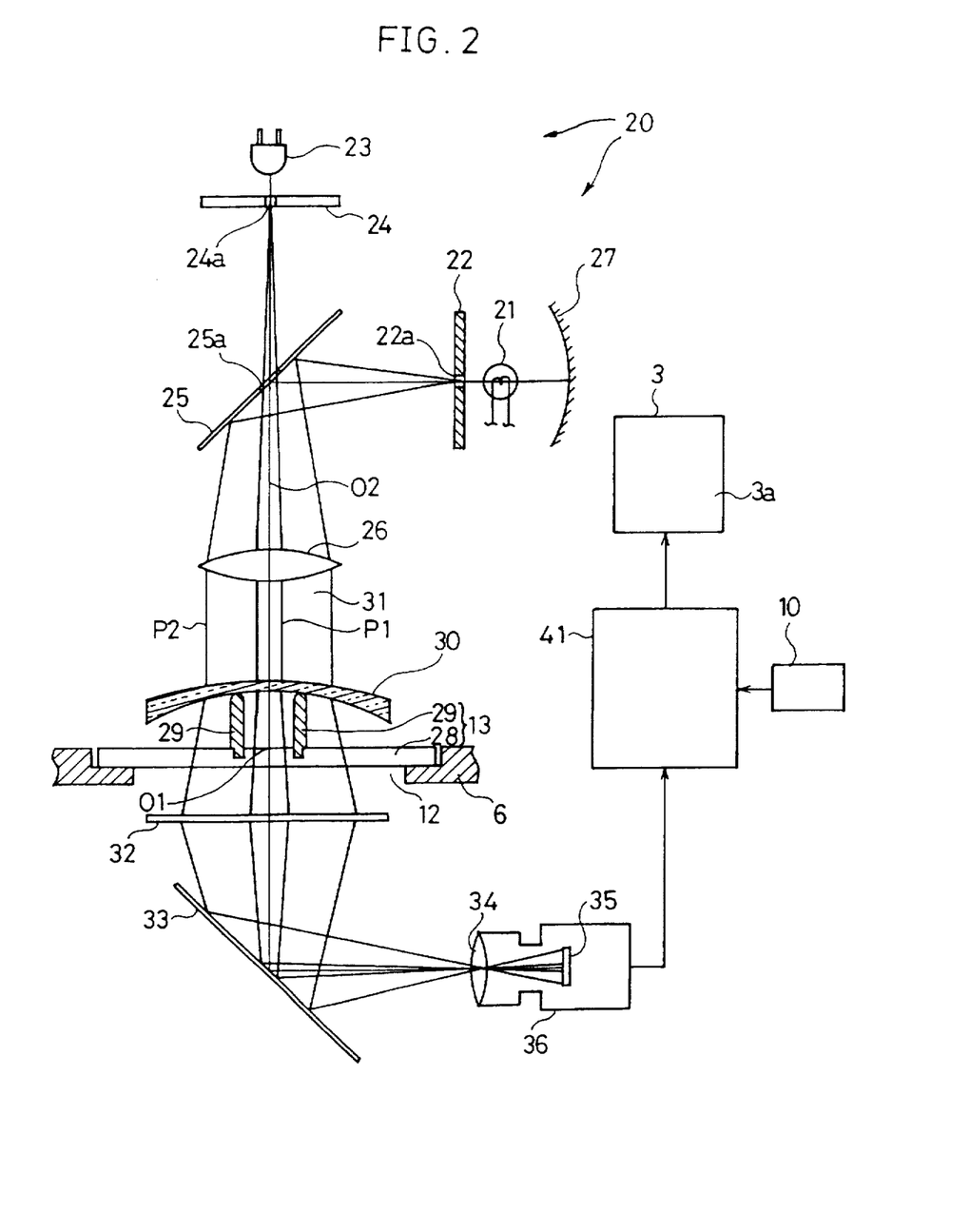
FIG. 2 is an optical diagram showing a first embodiment of the lens meter according to the present invention.

The lens receiving table 6 is formed with a stepped mounting hole 12, as shown in FIG. 2, and a lens receiver 13 is provided in this mounting hole 12. A circular unprocessed lens, a processed lens, or an eyeglass lens framed in the eyeglass frame is set on the lens receiver 13.

An optical measuring system shown in FIG. 2 is provided interiorly of the main body 2. In the figure, reference numeral 20 denotes a light source portion. The light source portion 20 has a first light source 21 for generating a measuring light beam, a first pinhole plate 22 with a pinhole 22a, a second light source 23 for generating a center position determining light beam (or a position specifying light beam), a second pinhole plate 24 with a pinhole 24a, a perforated mirror 25, and a collimator lens 26. Reference numeral 27 denotes a beam-condensing concave mirror, which is provided behind the first light source 21.

The first light source 21 is constituted by a halogen lamp, and the second light source 23 is constituted by a light-emitting diode (LED). The perforated mirror 25 is formed with an opening 25a. The first and second pinhole plates 22, 24 are disposed at the focal positions of the collimator lens 26. The collimator lens 26 fulfills a role of converting the light beams emitted from the first and second light sources 21 and 23 to collimated light beams. In this embodiment, the light beam emitted by the first light source 21 is represented by reference character P2, and the light beam emitted by the second light source 23 is represented by reference character P1.

Figure 3:
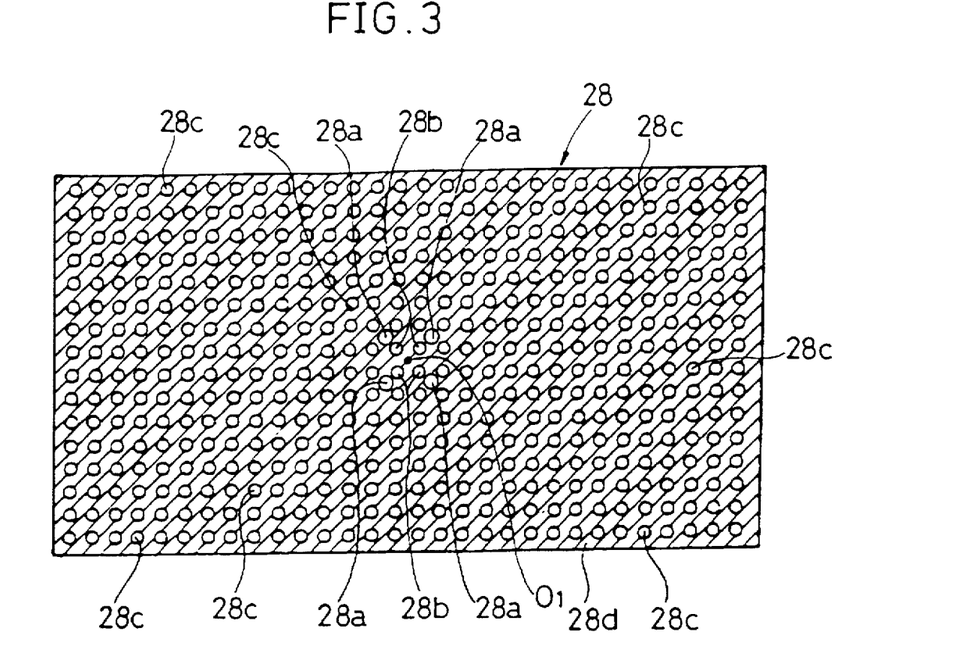
FIG. 3 is a plan view of the patterning plate shown in FIG. 1.

The lens receiver 13 is set in the lens receiving table 6. This lens receiver 13 is constituted by a patterning plate 28 and lens receiving pins 29. The patterning plate 28 is rectangular in shape as shown in FIG. 3 and is mounted in the lens receiving table 6 through the stepped mounting hole 12.

The patterning plate 28 is formed with four circular lens-receiving-pin mounting grooves 28a around the center position O1 of the patterning plate 28 so that the lens receiving pins 29 can be detachably mounted in the circular grooves 28a. Four inner circular holes 28b are formed around the center position of the patterning plate 28 and inside the circular grooves 28a. Also, a plurality of outer circular holes 28c are formed outside the circular grooves 28a of the patterning plate 28. The four inner circular holes 28b are employed to determine the center position O4 of pattern images (see FIGS. 4 through 6 and FIGS. 8 and 9) corresponding to the center position O1 of the patterning plate 28. The outer circular holes 28c are employed to determine the lens characteristics of a subject lens 30. The inner circular holes 28b are identical in size (opening area) with the outer circular holes 28c. The LED constituting the second light source 23 has large directional characteristics, and the position specifying light beam P1 emitted from the second light source 23 is passed through the opening 25a of the mirror 25 and is projected onto the inner circular holes 28b disposed inside the circular grooves 28a. On the other hand, the lens-characteristic measuring light beam P2 emitted from the first light source 21 is reflected by the perforated mirror 25 and is projected almost over the entire area of the patterning plate 28.

The outer circular holes 28c are formed at regular intervals, and the total number of the circular holes 28c is approximately 1000. The remaining portion of the patterning plate 28 constitutes a light shielding portion 28d.

In this embodiment, assume that an unprocessed lens with negative power has been set as a subject lens 30 on the lens receiver 13. In the optical path 31 of the lens-characteristic measuring light beam P2 a screen 32 is provided at a position of predetermined distance from the subject lens 30. This screen 32 consists, for example, of a diffusing plate.

Figure 4:
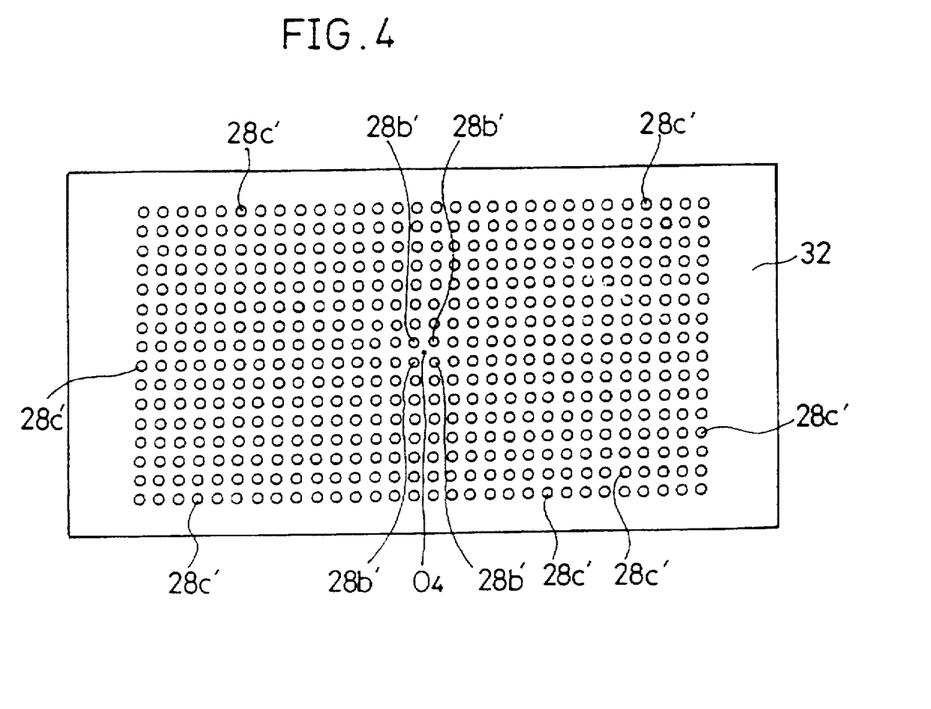
FIG. 4 is a plan view showing the pattern images projected on a screen when an eyeglass lens is not set in an optical path.

When the subject lens 30 has not been set in the optical path 31, the light beams P1 and P2, as they are collimated light beams, are guided to the patterning plate 28 and transmitted through the circular holes 28b and 28c formed in the patterning plate 28. Consequently, based on the transmitted light beams P1 and P2, pattern images corresponding to the patterning plate 28 are projected onto the screen 32, as shown in FIG. 4.

In the figure, the projected inner pattern images 28b' on the screen 32 correspond to the inner circular holes 28b of the patterning plate 28, and the projected outer pattern images 28c' on the screen 32 correspond to the outer circular holes 28c of the patterning plate 28.

Figure 5:
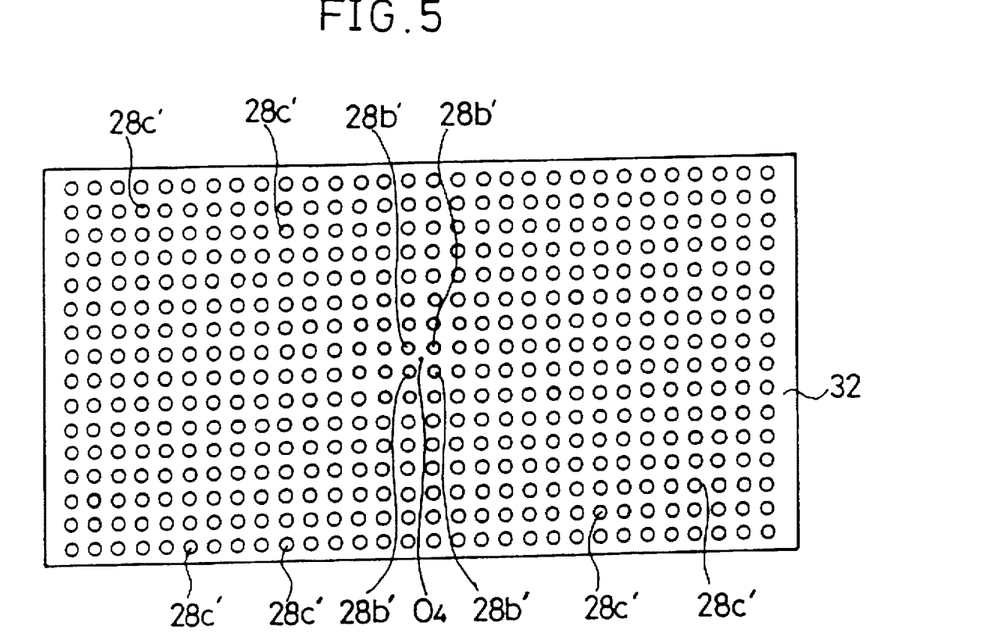
FIG. 5 is a plan view showing an example of the pattern images projected on a screen when an eyeglass lens with negative power is set in the optical path.
Figure 6:
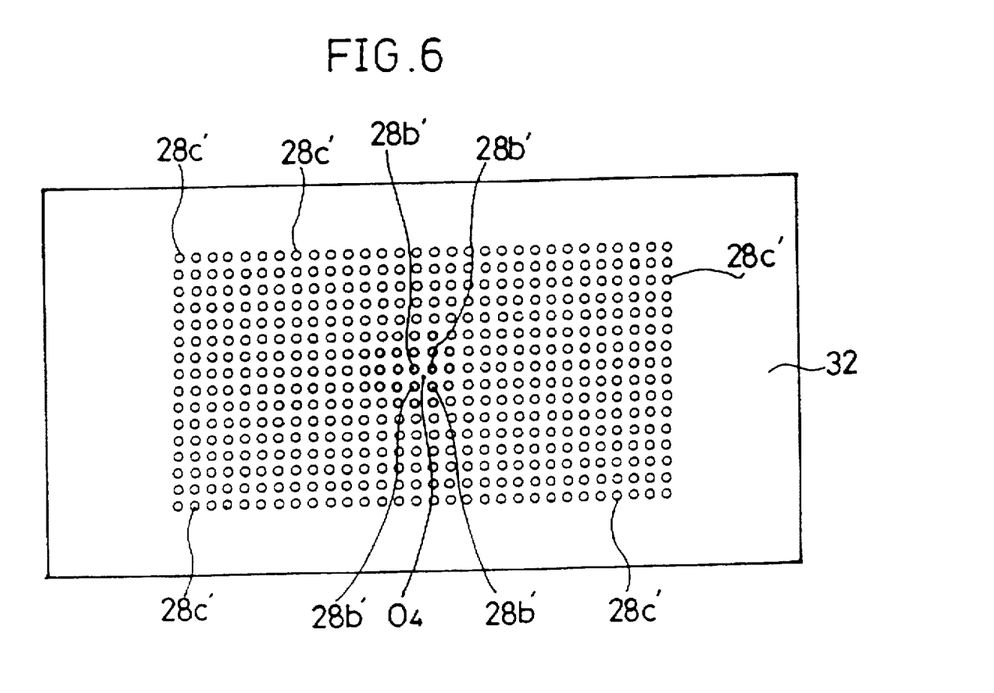
FIG. 6 is a plan view showing an example of the pattern images projected on a screen when an eyeglass lens with positive power is set in the optical path.

If the subject lens 30 is set in the optical path 31, then the light beams P1 and P2 will be projected onto the subject lens 30. The light beams P1 and P2 are subjected to deformation by the negative power of the subject lens 30 and are diffused. Consequently, as shown in FIG. 5, the spacing between the projected pattern images on the screen 32 becomes wider than that between the projected pattern images (FIG. 4) which are obtained when no subject lens is set in the optical path 31. If a subject lens with positive power (not shown) is set in the optical path 31, the light beams P1 and P2 will be subjected to deformation by the positive power of the subject lens and will be converged. As a consequence, as shown in FIG. 6, the spacing between the projected pattern images on the screen 32 becomes narrower than that between the projected pattern images (FIG. 4) which are obtained when no subject lens is set in the optical path 31. By obtaining the spacing between the projected pattern images at each point on the screen 32, the lens characteristics of the subject lens 30 (e.g., degree distribution) can be obtained. Notice in FIGS. 5 and 6 that the projected pattern images have been shown on the assumption that the optical axis O3 of the subject lens 30 and the optical axis O2 of the optical path 31 are coincident with each other.

In the optical path 31 there is provided a reflecting mirror 33 behind the screen 32. In the reflected optical path of the reflecting mirror 33 a CCD camera 36 is provided, and the CCD camera 36 comprises an image forming lens 34 and a CCD 35. The CCD 35 is provided at a position which is conjugate with the screen 32 with respect to the image forming lens 34, and consequently, the pattern images projected on the screen 32 are projected onto the CCD 35.

The CCD 35 is connected to a processing circuit 41. This processing circuit 41 performs at least determination processing and analysis processing. In the determination processing, the center position O4 of the projected pattern images on the screen 32 corresponding to the center position O1 of the patterning plate 28 is determined based on the position specifying light beam P1. In the analysis processing, the lens characteristics of the subject lens 30 are analyzed based on the lens-characteristic measuring light beam P2. The processing circuit 41 is connected to a change-over switch 10. In this embodiment, the processing circuit 41 is switched between the determination processing and the analysis processing by the change-over switch 10.

Figure 7:
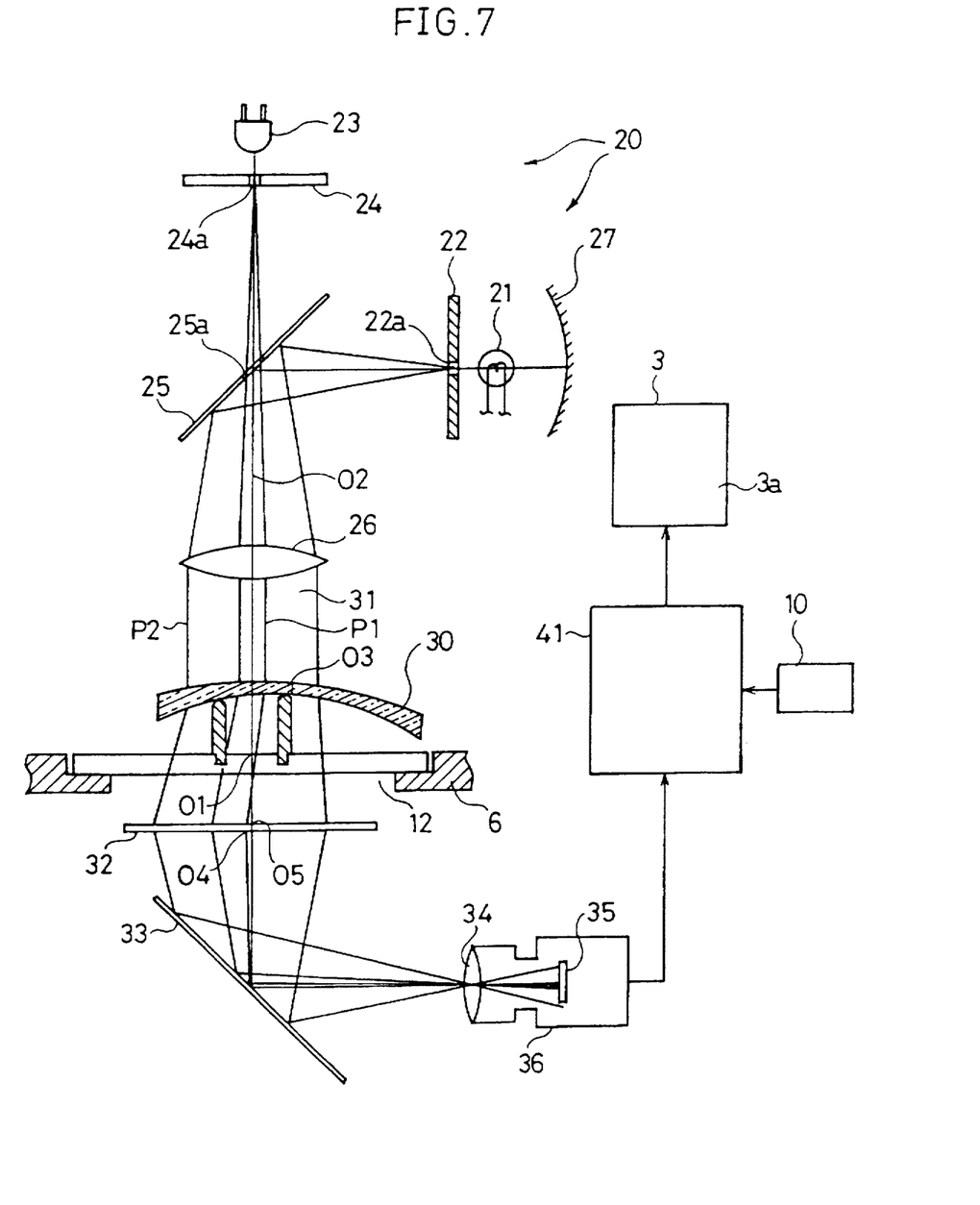
FIG. 7 is an optical diagram showing the first embodiment of the lens meter according to the present invention, a subject lens being offset from the optical axis of the optical path.
Figure 8:
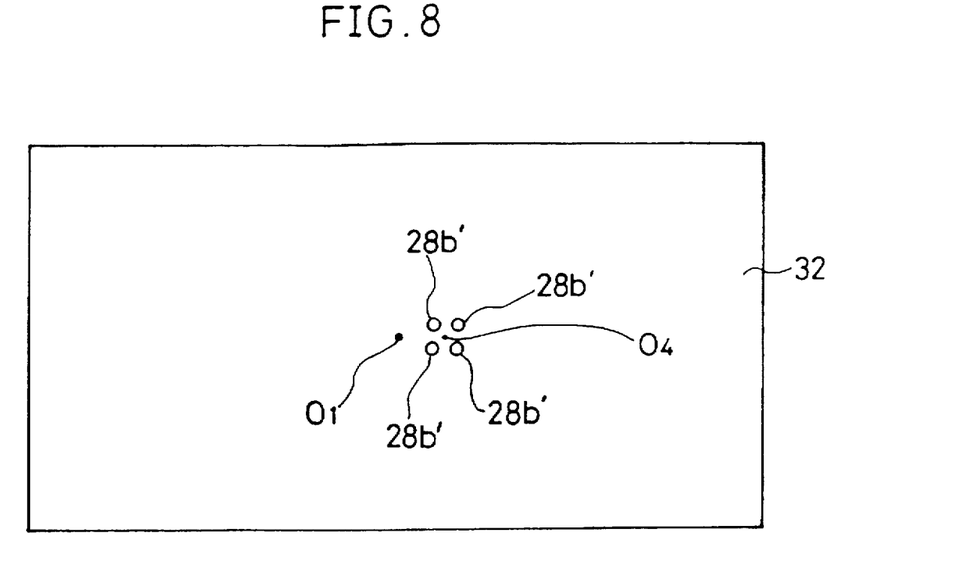
FIG. 8 is a plan view showing the state where only the images of center-position determining patterns have been projected on the screen shown in FIG. 2.
Figure 9:
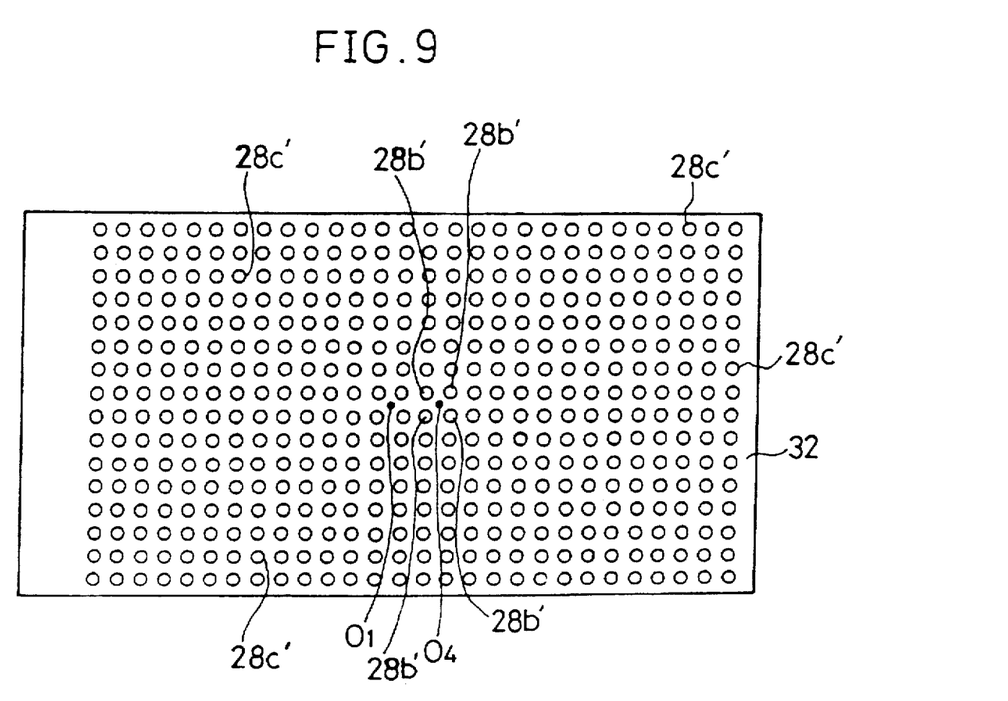
FIG. 9 is a plan view showing the state where the images of center-position determining patterns and the images of lens-characteristic measuring patterns have been projected on the screen.

For example, if the change-over switch 10 is turned on with the measurement start switch 11 turned off, the second light source 23 alone will be lit and the first light source 21 will remain turned off. When the optical axis O3 of the subject lens 30 is offset from the optical axis O2 of the optical path 31, the position specifying light beam P1 is deflected as shown in FIG. 7 by the subject lens 30 and the inner holes 28b of the patterning plate 28 are projected as four images 28b' on an area deflected from the center position O5 of the screen 32. As shown in FIG. 8, if the center position O4 of the four projected images 28b' is detected, the center position O4 can be determined when the subject lens 30 is offset from the optical axis of the optical path 31. Next, if the measurement start switch 11 is turned on, the first light source 21 will be lit along with the second light source 23. As a consequence, the outer pattern images 28c' are obtained on the screen 32 along with the inner pattern images 28b', as shown in FIG. 9. The center position O4 of the inner pattern images 28b' has already been obtained, and therefore, if degree distribution analysis is performed by the processing circuit 41, the lens characteristics of the subject lens 30 will be obtained. At this time, the processing circuit 41 functions as a means for specifying the position of a position specifying pattern image.

According to the first embodiment of the present invention, the center position O4 of the projected images on the screen 32 can be determined based on the four projected images 28b', so the specification of the center position O4 can be quickly performed.

First Modification

In the first embodiment of the present invention, while the position specifying light beam P1 has been projected on the patterning plate 28 by employing the perforated mirror 25, the present invention can also be constructed so that the wavelength of the position specifying light beam P1 and the wavelength of the lens-characteristic measuring light beam P2 are made different from each other and so that the position specifying light beam P1 alone is transmitted through an area corresponding to the opening 25a of the perforated mirror 25 and also the lens-characteristic measuring light beam P2 is reflected.

Second Modification

In the first embodiment of the present invention, although the first light source 21 has been turned off and the second light source 23 alone has been turned on to obtain the center position O4 of the projected pattern images on the screen 32, the center position O4 can also be obtained with the first light source 21 turned on.

Figure 10:
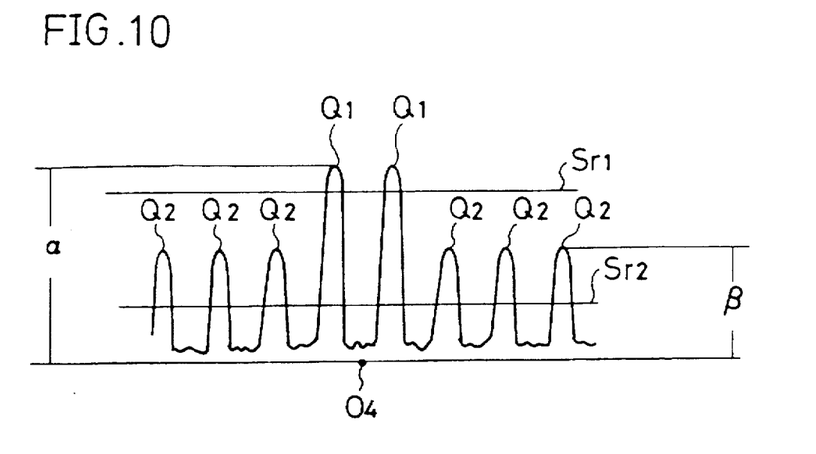
FIG. 10 is a diagram showing a light quantity distribution based on the pattern images shown in FIG. 9.

In this case, the light quantity of the first light source 21 and the light quantity of the second light source 23, for example, are previously set so that the luminance brightness of the projected inner images 28b' on the screen 32 becomes greater than that of the projected outer images 28c'. If the light quantity of the first light source 21 and the light quantity of the second light source 23 are set like this, the light quantity Q1 based on the projected inner images 28b' can be made greater than the light quantity Q2 based on the projected outer images 28c'. Therefore, if slice levels Sr1 and Sr2 are set by the processing circuit 41, the projected inner images 28b' and the projected outer images 28c' can be discriminated from each other. Also, if the center position O4 of the projected images on the screen 32 is specified by the slice level Sr1 and the position of the projected outer images 28c' is detected by the slice level Sr2, likewise the center position O4 can be quickly specified.

In the second modification, the first light source 21 can be kept on at all times. In the case where a halogen lamp is employed as the first lamp 21, if the halogen lamp is repeatedly turned on and off, the filament degradation in the halogen lamp will be accelerated and the life of the halogen lamp will be shortened. However, in the second modification, shortening halogen lamp life can be suppressed.

Note that the lighting voltage of the halogen lamp may be reduced in a range which can maintain a halogen cycle in order to reduce the luminance brightness of the halogen lamp. Also, the halogen lamp is caused to be always in a light-on state, and the false light-out state of the halogen lamp can be created by a mechanical shutter. However, in this case the structure becomes complicated compared with the first modification.

Third Modification

In the case where the light quantity of the light beam of the second light source 23 is sufficiently large, even if the first and second light sources 21 and 23 are not separate light sources, the light quantity distribution of images shown in FIG. 10 will likewise be obtainable if the transmittance of the inner circular holes 28b of the patterning plate 28 is made greater than that of the outer circular holes 28c. Even in this case the center position O4 of the projected inner images 28c on the screen 32 can be specified.

Fourth Modification

Figure 11A:
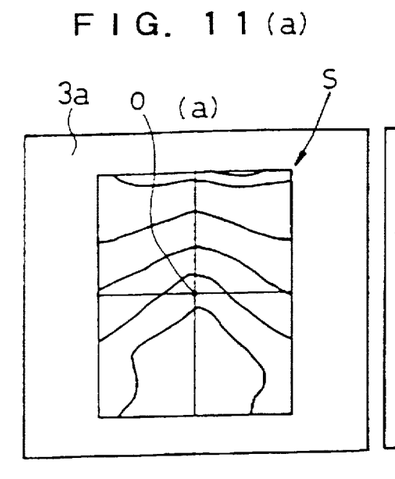
FIG. 11(a) is a diagram showing an example of the mapping display of each lens characteristic value of an eyeglass lens, a spherical degree distribution being shown.
Figure 11B:
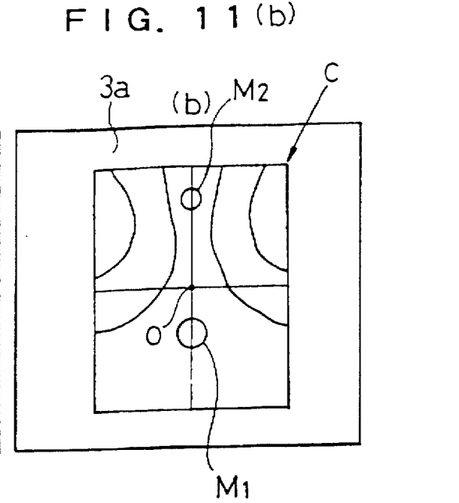
FIG. 11(b) is a diagram similar to FIG. 11(a) showing a cylindrical degree distribution.
Figure 11C:
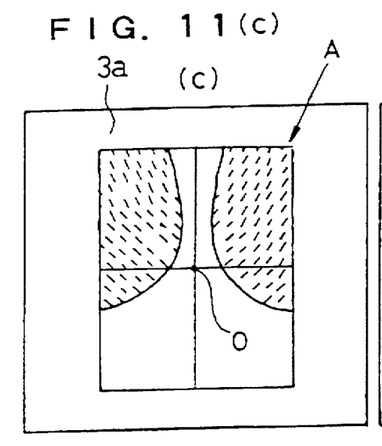
FIG. 11(c) is a diagram similar to FIG. 11(a) showing an axial angle distribution.
Figure 11D:
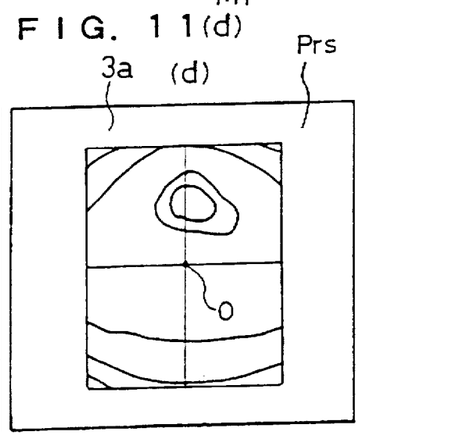
FIG. 11(d) is a diagram similar to FIG. 11(a) showing a prism degree distribution.

According to this modification of the present invention, a subject lens framed in the eyeglass can also be measured. FIG. 11 shows an example of the case where a framed subject lens is measured, and the projected image is rectangular in shape in correspondence with the configuration of the patterning plate 28. FIG. 11(a) shows a spherical degree S, FIG. 11(b) a cylindrical degree C, FIG. 11(c) an axial angle A, and FIG. 11(d) a prism degree Prs.

Figure 11E:
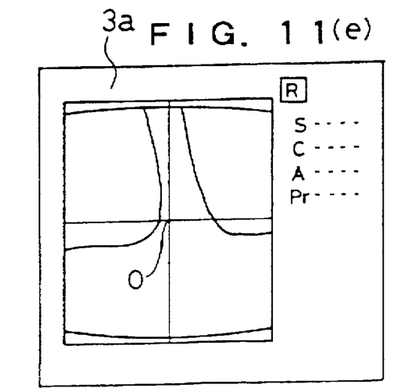
FIG. 11(e) is a diagram similar to FIG. 11(a) showing measured values along with the cylindrical degree distribution.
Figure 11F:
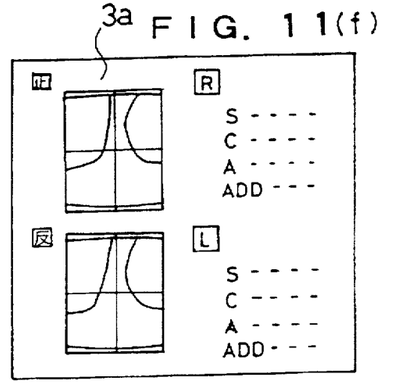
FIG. 11(f) is a view similar to FIG. 11(a) showing the cylindrical degree distributions of an eyeglass lens for a left eye and an eyeglass lens for a right eye, one image having been inverted with respect to the other.

As shown in FIG. 11(e), the measured numerical values of the spherical degree S, cylindrical degree C, axial angle A, and prism degree Prs, for example, can also be displayed at the same time in parallel with the mapping display of the cylindrical degree C. Furthermore, as shown in FIG. 11(f), it is also possible to display the image of an eyeglass lens for a left eye (L) and the image of an eyeglass lens for a right eye (R) at the same time and in addition, one image can be invertedly displayed in correspondence with the other. If displayed like this, it will be easy to know the layout of a

9 subject lens in the state where the subject lens is framed in the eyeglass frame.

Second Embodiment

Figure 12:
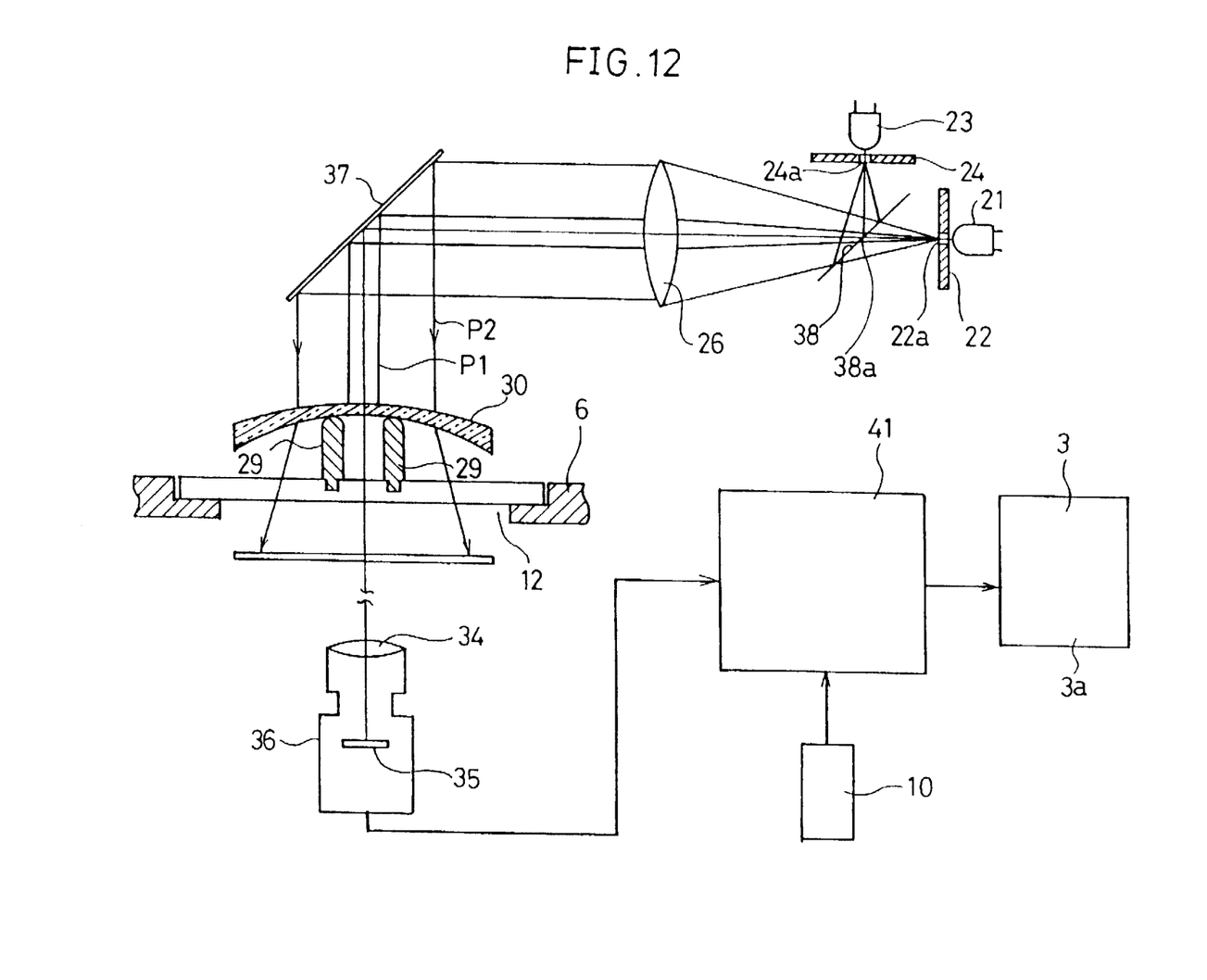
FIG. 12 is an optical diagram showing a second embodiment of the lens meter according to the present invention.

In a second embodiment of the present invention, a reflecting mirror 37 is employed instead of the perforated mirror 25 of the light source portion 20 of the first embodiment and also LEDs are employed in both a first light source 21 and a second light source 23. Furthermore, a collimator lens 26 is provided between the reflecting mirror 37 and the light sources 21 and 23, and a band-pass mirror 38 is provided between the collimator lens 26 and the light sources 21 and 23. The position specifying light beam P1 of the first light source 21 differs in wavelength from the lens-characteristic measuring light beam P2 of the second light source 23, and the band-pass mirror 38 has a light transmitting portion 38a which transmits only the position specifying light beam P1 at the central portion thereof. The lens-characteristic measuring light beam P2 from the second light source 23 is reflected by the entire area of the band-pass mirror 38.

Depending upon the type of the subject lens 30, there are cases where a predetermined light quantity ratio of the projected pattern images 28b' and 28c' cannot be obtained on the screen 32. In such cases, if the light quantity α (see FIG. 10) of the position specifying light beam P1 of the first light source 21 and the light quantity β of the lens-characteristic measuring light beam P2 of the second light source 23 are adjusted, a light quantity ratio of the projected inner image 28b' and the projected outer image 28c' can be appropriately changed.

Fifth Modification

Figure 13:
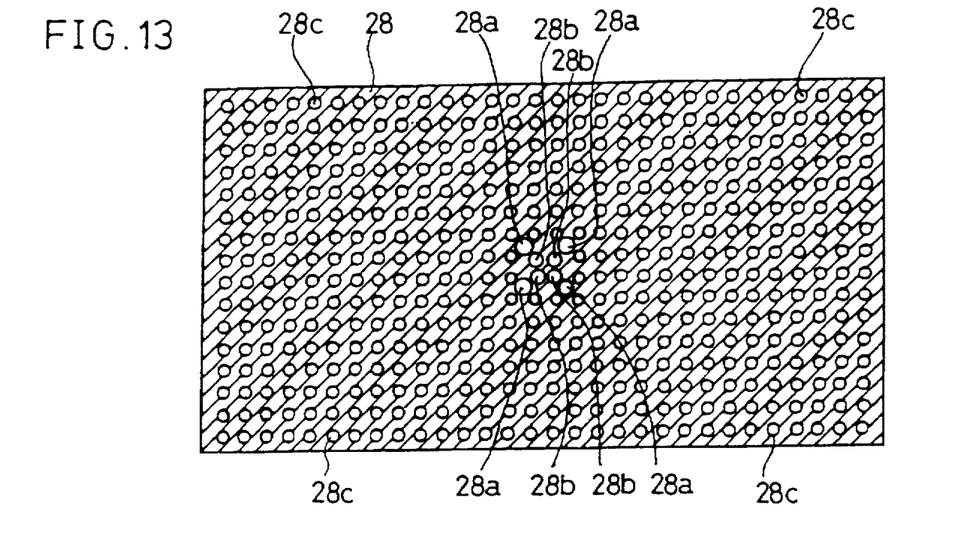
FIG. 13 is a plan view showing a patterning plate of a fifth modification of the second embodiment of the present invention.
Figure 14:
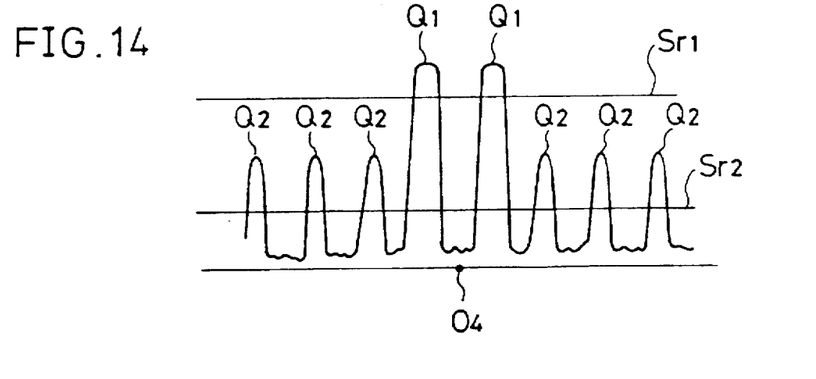
FIG. 14 is a diagram showing a light quantity distribution based on the patterning plate shown in FIG. 13.

As shown in FIG. 13, by making the transmitting area (size) of the inner circular hole 28b of the patterning plate 28 greater than that of the outer circular hole 28c, the projected inner image 28b' and the projected outer image 28c' may also be discriminated from each other by the size of the transmitting area and the difference in light quantity, as shown in FIG. 14.

Figure 15:
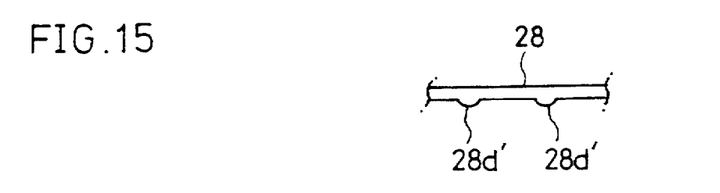
FIG. 15 is a sectional view showing the essential part of a modification of the patterning plate shown in FIG. 10.
Figure 16:
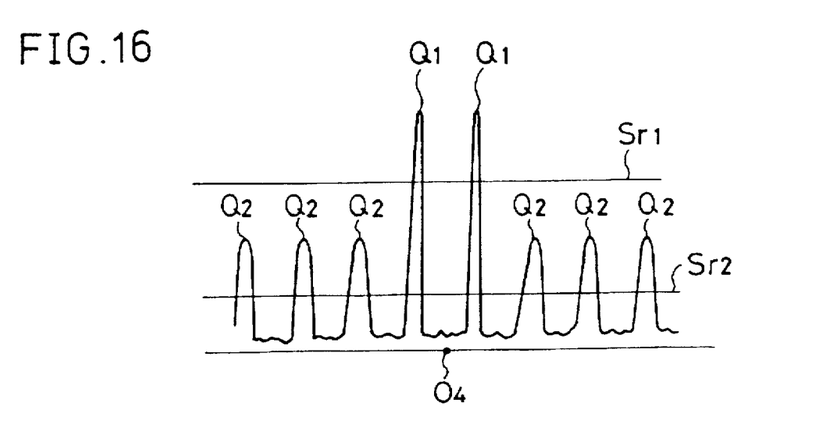
FIG. 16 is a diagram showing a light quantity distribution based on the patterning plate shown in FIG. 15.

Also, as shown in FIG. 15, if converging lens portions 28d' are provided at the back surface of the central portion of the patterning plate 28 shown in FIG. 3 and at positions corresponding to the inner circular holes 28b in order to converge the position specifying light beam P1 onto the screen 32, the luminance brightness of the projected inner image 28b' can be made greater than that of the projected outer image 28c' even when the quantity of light which is emitted by the first light source 21 is the same as the second light source 23. In this case, as with the third modification, the light source portion may comprise a single light source.

In the aforementioned embodiments, the first light source 21 has been lit by turning the measurement switch 11. However, when the value of the center position O4 of the projected images on the screen 32 does not change for a predetermined time, the processing circuit 41 may switch display from a follow state to a mapping display state, by judging that the movement of the subject lens 30 has been stopped and then automatically lighting the first light source 21.

In addition, with the center-position determining light beam P1, the lens characteristics of only the center portion of the subject lens 30 can be measured and the measurement of the outer portion of the subject lens 30 can be performed.

Since the lens meter according to the present invention has been constructed as described above, the specification of

10 the position of the projected pattern image corresponding to the center position of the patterning plate can be performed quickly and accurately, so the present invention has the advantage that the display of images following movement of a subject lens becomes possible.

While the present invention has been described with reference to preferred embodiments thereof, the invention is not to be limited to the details given herein, but may be modified within the scope of the appended claims.

What is claimed is:

1. A lens-meter comprising:

a light source portion with a first light source for generating a lens-characteristic measuring light beam and a second light source for generating a position specifying light beam;

a patterning plate with lens-characteristic measuring patterns and position specifying patterns, the patterning plate being provided in an optical path of said lens-characteristic measuring light beam and position specifying light beam generated by said light source portion;

means for receiving images of the lens-characteristic measuring patterns obtained by projecting said lens-characteristic measuring light beam onto a subject lens set in said optical path;

means for analyzing the received pattern images; and means for performing a mapping display of a two-dimensional lens characteristic distribution of said subject lens, based on the analyzed pattern images; and wherein said first and second light sources are separate from each other, and said position specifying light beam of said second light source serves to obtain a pattern image corresponding to a center of said patterning plate.

2. The lens meter as set forth in claim 1, wherein a ratio of a quantity of light which is emitted by said first light source and a quantity of light which is emitted by said second light source can be changed.

3. The lens meter as set forth in claim 1, wherein said position specifying light beam is employed in said lens-characteristic measuring light beam.

4. The lens meter as set forth in claim 3, wherein a lens portion is formed on a back surface of said patterning plate for converging or diverging said lens-characteristic measuring light beam transmitted through said patterning plate.

5. The lens meter as set forth in any one of claims 1 through 4, wherein said first light source is constituted by a halogen lamp and wherein said halogen lamp is always lit during measurement.

6. The lens meter as set forth in claim 1, wherein specification means is provided for specifying positions of images of said position specifying patterns, based on said lens-characteristic measuring light beam transmitted through the position specifying patterns of said patterning plate.

7. A lens-meter comprising:

a light source portion for generating a lens-characteristic measuring light beam and for generating a position specifying light beam;

a patterning plate with lens-characteristic measuring patterns and position specifying patterns, the patterning plate being provided in an optical path of said lens-characteristic measuring light beam and position specifying light beam generated by said light source portion;

means for receiving images of said lens-characteristic measuring patterns obtained by projecting said lens-characteristic measuring light beam onto a subject lens set in said optical path;

means for analyzing the received pattern images; and means for performing a mapping display of a two-dimensional lens characteristic distribution of said subject lens, based on the analyzed pattern images; and wherein transmittance of the position specifying patterns for obtaining a pattern image corresponding to a center of said patterning plate is greater than that of said lens-characteristic measuring patterns.

8. The lens meter as set forth in claim 7, wherein a portion of said lens-characteristic measuring light beam is employed in said position specifying light beam.

9. The lens meter as set forth in any one of claims 1, 2, 3, or 7, wherein a transmitting area of a single pattern of said position specifying patterns formed in said patterning plate is larger than that of a single pattern of said lens-characteristic measuring patterns formed in another portion of said patterning plate.

10. A lens-meter comprising:

a light source portion for generating a lens-characteristic measuring light beam and for generating a position specifying light beam;

a patterning plate with lens-characteristic measuring patterns and position specifying patterns, the patterning plate being provided in an optical path of said lens-characteristic measuring light beam and position specifying light beam generated by said light source portion;

means for receiving images of said lens-characteristic measuring patterns obtained by projecting said lens-characteristic measuring light beam onto a subject lens set in said optical path;

means for analyzing the received pattern images; and means for performing a mapping display of a two-dimensional lens characteristic distribution of said subject lens, based on the analyzed pattern images; and wherein images of said position specifying patterns are discriminated from those of said lens-characteristic measuring patterns, based on the fact that a light quantity of each image of said position specifying patterns based on the light beam transmitted through the position specifying patterns for obtaining a pattern image corresponding to a center of said patterning plate is greater than that of each image of said lens-characteristic patterns based on the light beam transmitted through said lens-characteristic specifying patterns.

* * * * *